US010766176B2

(12) United States Patent
Jenko (10) Patent No.: US 10,766,176 B2
(45) Date of Patent: Sep. 8, 2020

(54) INJECTION-MOLDING SYSTEMS HAVING HOT-RUNNER MANIFOLDS CONTAINING NON-MELT INTERNAL CHANNELS FOR PROVIDING OPERABILITY ENHANCEMENTS

(71) Applicant: Husky Injection Molding Systems Ltd., Bolton (CA)

(72) Inventor: Edward Joseph Jenko, Essex, VT (US)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 210 days.

(21) Appl. No.: 14/905,981

(22) PCT Filed: Aug. 1, 2014

(86) PCT No.: PCT/US2014/049326
§ 371 (c)(1),
(2) Date: Jan. 19, 2016

(87) PCT Pub. No.: WO2015/017741
PCT Pub. Date: Feb. 5, 2015

(65) Prior Publication Data
US 2016/0151948 A1    Jun. 2, 2016

Related U.S. Application Data

(60) Provisional application No. 61/861,096, filed on Aug. 1, 2013.

(51) Int. Cl.
*B29C 45/40* (2006.01)
*B29C 45/27* (2006.01)
*B29C 45/28* (2006.01)

(52) U.S. Cl.
CPC ...... *B29C 45/2738* (2013.01); *B29C 45/2725* (2013.01); *B29C 45/2737* (2013.01);
(Continued)

(58) Field of Classification Search
CPC ........ B29C 2045/2754; B29C 45/2725; B29C 45/2737; B29C 45/2738
See application file for complete search history.

(56) References Cited

U.S. PATENT DOCUMENTS 3,661,487 A * 5/1972 Susin ................ B29C 45/20
                                                    425/543
3,671,159 A * 6/1972 Greenberg et al. .........................
                                                    B29C 33/0077
                                                    425/155
(Continued)

FOREIGN PATENT DOCUMENTS

CA    2781542 A1 * 6/2011 ............ B29C 45/27
JP    S52145463 A    12/1977
(Continued)

OTHER PUBLICATIONS

International Search Report, dated Nov. 18, 2014, 3 pages.
(Continued)

*Primary Examiner* — Joseph S Del Sole
*Assistant Examiner* — Thu Khanh T Nguyen (57) ABSTRACT

Hot-runner manifolds that contain one or more types of non-melt channels in addition to melt channels, and injection-molding systems containing such hot-runner manifolds. The differing types of non-melt channels include: coolant channels for carrying a coolant for cooling the tips of hot-tip nozzles, for example, during hot latching operations; heating-fluid channels for carrying a heating fluid for heating melt within melt channels within the hot-runner manifolds; and actuation-fluid channels for carrying actuation fluid to valves of valve-actuated nozzles. In each case, nozzles can
(Continued)

be formed unitarily monolithically with the hot-runner manifolds and one or more of the various types of non-melt channels can be continuously routed within such unitary monolithic nozzles. Freeform fabrication processes can be used to form hot-runner manifolds of the present disclosure, which often contain complex/intricate internal passageways that form the various types of melt and non-melt channels.

10 Claims, 5 Drawing Sheets (52) U.S. Cl.
CPC ............. *B29C 2045/2754* (2013.01); *B29C 2045/2827* (2013.01)

(56) References Cited

U.S. PATENT DOCUMENTS

| | | | |
|---|---|---|---|
| 3,740,179 A | 6/1973 | Schmidt | |
| 4,309,163 A * | 1/1982 | Cottancin | B29C 45/20 264/328.15 |
| 4,438,064 A * | 3/1984 | Tsutsumi | B29C 45/30 264/328.15 |
| 4,687,613 A | 8/1987 | Tsutsumi | |
| 4,917,593 A * | 4/1990 | Gellert | B29C 45/2806 264/328.15 |
| 4,955,804 A | 9/1990 | Martell et al. | |
| 5,007,821 A * | 4/1991 | Schmidt | B29C 45/2725 264/328.14 |
| 5,118,280 A * | 6/1992 | Gellert | B29C 45/2737 264/328.15 |
| 5,378,138 A | 1/1995 | Onuma et al. | |
| 5,834,041 A | 11/1998 | Sekine | |
| 6,030,202 A | 2/2000 | Gellert et al. | |
| 6,149,423 A | 11/2000 | Manz | |
| 6,447,283 B1 * | 9/2002 | Gellert | B29C 45/2738 264/328.14 |
| 7,241,131 B1 * | 7/2007 | Booth | B29C 45/2737 219/543 |
| 7,997,895 B1 | 8/2011 | Schmidt | |
| 2002/0110649 A1 | 8/2002 | Skszek et al. | |
| 2004/0131722 A1 | 7/2004 | Dufner | |
| 2011/0244070 A1 * | 10/2011 | Schmidt | B29C 45/281 425/557 |

FOREIGN PATENT DOCUMENTS

| | | |
|---|---|---|
| JP | S60206613 A | 10/1985 |
| JP | 11-48288 A | 2/1999 |
| JP | 2002210795 A | 7/2002 |

OTHER PUBLICATIONS

Partial European Search Report, dated Jul. 19, 2017, 13 pages.
Extended European Search Report, dated Dec. 11, 2017, 12 pages.
European Search Report; dated Jul. 19, 2017;13 pages.
Japanese Office Action; dated Jun. 12, 2017.

* cited by examiner

FIG. 5

INJECTION-MOLDING SYSTEMS HAVING HOT-RUNNER MANIFOLDS CONTAINING NON-MELT INTERNAL CHANNELS FOR PROVIDING OPERABILITY ENHANCEMENTS

FIELD OF THE INVENTION

The present invention generally relates to the field of injection molding. In particular, the present invention is directed to injection-molding systems having hot-runner manifolds containing non-melt internal channels for providing operability enhancements.

BACKGROUND

An injection-molding manifold distributes one or more molten materials, or one or more "melts," such as one or more plastics, from an injection-molding machine to injection-molding nozzles via a network of melt-channels within the manifold. Each melt is intermittently delivered to one or more mold cavities via the injection-molding nozzles during molding operations. The melt in each melt-channel is typically heated using electrical heaters located on the exterior of the manifold. If the nozzles are of a valve-gated type, actuators that reside on the side of the manifold opposite the nozzles are typically used. Sometimes equipment operators disengage and reengage the nozzles with a mold plate/gate inserts while the nozzles are still hot. This is known as "hot latching" and can lead to excessive wear and damage to the nozzles and/or mold plate/gate inserts where the components engage one another.

SUMMARY OF THE DISCLOSURE

In one implementation, the present disclosure is directed to an injection-molding system. The system includes a hot-runner manifold comprising a body that includes a melt-inlet, an injection-nozzle region, a melt channel extending from the melt inlet to the injection-nozzle region, a non-melt-fluid inlet, a non-melt-fluid outlet, and a non-melt fluid channel extending from the non-melt-fluid inlet to the non-melt-fluid outlet and being fluidly isolated from the melt channel.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

An aspect of the present invention is the providing of one or more types of non-melt channels to a hot-runner manifold of an injection-molding apparatus to any one or more of a variety of functionalities to the injection-molding apparatus. Such functionalities include, but are not limited to, providing a cooling fluid (e.g., air) to tips of injection nozzles, providing an actuating fluid, (e.g., air or liquid) to injection valves, and providing a heating fluid (e.g., a high-temperature alkylated aromatic compound, oil, etc.) for maintaining the temperature of melt in the melt channels within the hot-runner manifold. As will become apparent from reading this entire disclosure, such non-melt channels can be provided in any manner, such as via conventional machining processes and conventional casting processes, as well as additive manufacturing processes, among others. As will also become apparent from reading this entire disclosure, injection-molding apparatus components, such as hot-runner manifolds and nozzles, made using one or more additive manufacturing processes can be "finely tuned" in terms of material usage and optimization and configuration optimization so as to produce highly effective and efficient components. As will be seen below, this fine tuning also extends to the functionalities and features provided by the non-melt channels described herein. That said, similar non-melt channels can also be executed with conventional manufacturing processes with commensurate success.

Figure 1:
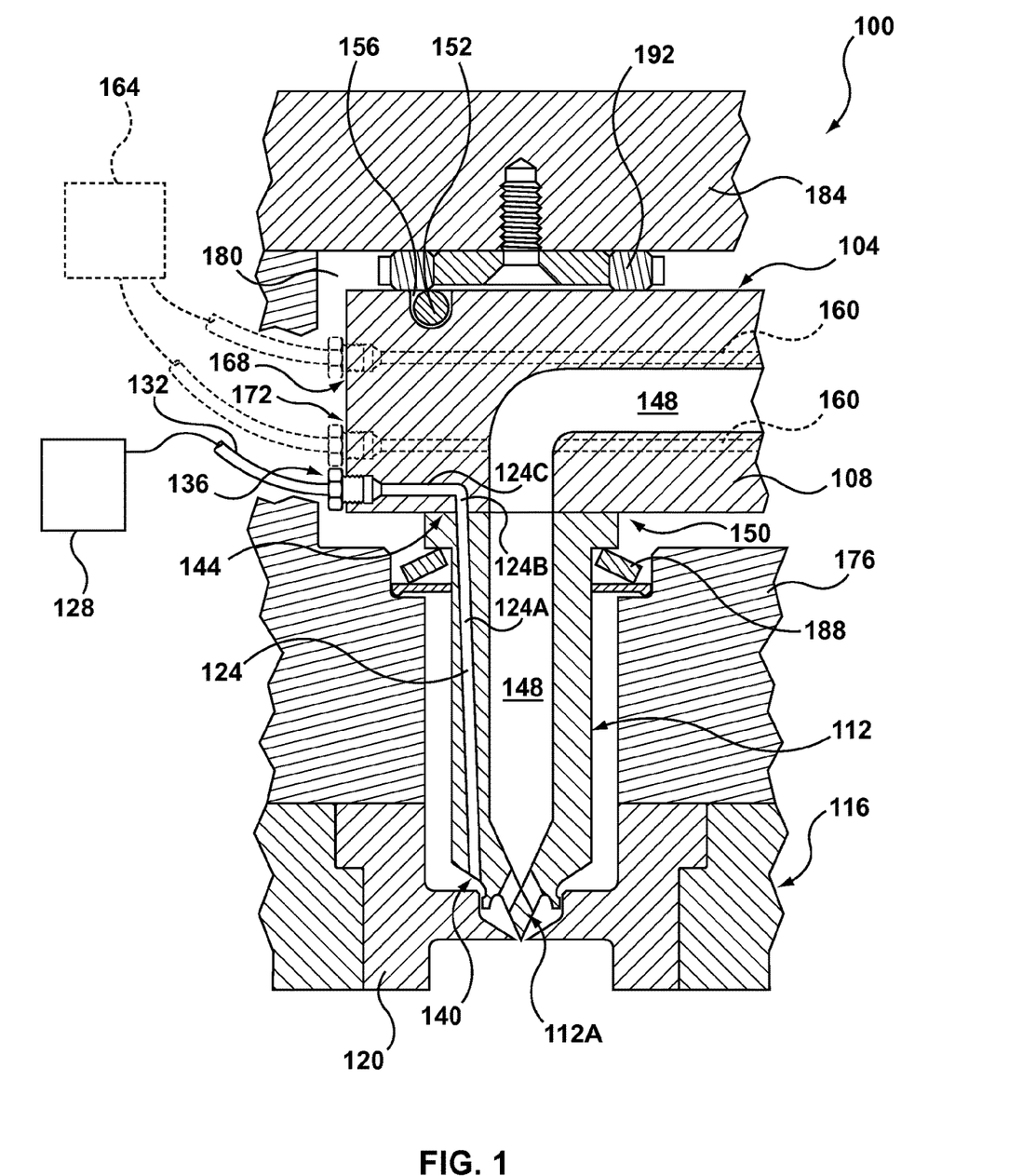
FIG. 1 is a cross-sectional partial view of an injection-molding apparatus that includes a hot-runner manifold containing non-melt channels for nozzle cooling.

Turning now to the drawings, FIG. 1 illustrates an injection-molding apparatus 100 made in accordance with aspects of the present invention. Injection-molding apparatus 100 includes a hot-runner assembly 104 that includes a manifold 108 and a plurality of hot-tip type nozzles, one of which is shown as hot-tip nozzle 112. As noted above, a practice among some injection molders is to perform a "hot-latching" procedure in which a mold, here mold 116, is disengaged from a hot-runner assembly, here assembly 104, while apparatus 100 is still hot. This can be problematic because the tips of the nozzles, here tip 112A of nozzle 112, is still hot and, therefore, is typically thermally expanded into firm engagement with the mold, here with a gate insert 120 of mold 116. Thus, when moving mold 116 away from hot-runner assembly 104, the firm engagement of tip 112A with gate insert 120 can result in severe wear of one or both parts or even damage to one or both parts. To minimize the wear/damage, provisions are made in injection-molding apparatus 100 for allowing an operator to cool each nozzle tip, here, tip 112A, by providing an integral non-melt coolant channel 124, which in the embodiment shown, has, in conjunction with nozzle 112, a segment 124A formed in hot-runner manifold 108 and a segment 124B formed in nozzle 112.

Coolant channel 124 can receive a coolant, such as air, from a coolant source 128 (e.g., an air compressor) via any suitable means, such as a fitting, here a hose 132 having a quick-connect fitting 136 designed and configured to be quickly engaged with hot-runner manifold 108 when the operator (not shown) desires to perform a hot-latching procedure. In this embodiment, quick-connect fitting 136 eliminates the need for coolant source 128 to be connected to hot-runner manifold 108 during molding operations. That said, any suitable connection can be made between coolant source 128 and hot-runner manifold 108, including a connection that remains connected during molding operations other than hot-latching. It is noted that hose 132 and quick-connect fitting 136 can serve all hot-tip nozzles (only one nozzle 112 shown for convenience) on hot-runner manifold 108. For example, in FIG. 1, a segment 124C of coolant channel 124 within hot-runner manifold 108 can provide coolant to any one or more of the other hot-tip nozzles that are not illustrated but that are off to the right relative to FIG. 1.

In this embodiment, hot-tip nozzle 112 is formed separately from hot-runner manifold 108, and each of the nozzle and manifold can be made using any suitable techniques. In one example, segments 124A to 124C of coolant channel 124 can be drilled. Alternatively, segments 124A to 124C of coolant channel 124 can be formed as part of a casting process or an additive manufacturing process, a/k/a a freeform fabrication process. An important aspect of providing cooling for nozzle tip 112A is to deliver coolant to a location proximate to the nozzle tip. FIG. 1 illustrates one location of an outlet 140 for coolant channel 124. However, those skilled in the art will readily appreciate that other outlet locations are contemplated, as are more complex outlets, such as multiple outlets fed by a common coolant-channel segment and multiple outlets fed by individual coolant channel segments, and a combination thereof. Since hot-tip nozzle 112 is formed separately from hot-runner manifold 108 in this example, provisions may need to be made to ensure proper alignment of segments 124A and 124B of coolant channel 124 at interface 144 at operating temperatures. Because similar alignment issues are often encountered in the design and execution of conventional hot-runner assemblies, those skilled in the art will readily be able to configure hot-tip nozzle 112 and hot-runner manifold 108 to ensure such alignment.

Hot-runner manifold 108 and hot-tip nozzles 112 include melt channels 148 that carry a melt (not shown), such as a plastic melt, from an injection machine (not shown) to mold 116 during injection molding operations. Although not shown but as will be readily understood by those skilled in the art, melt channels 148 extend from one or more inlets that receive the melt from the injection machine to hot-tip nozzles 112. Each inlet is formed in hot-runner manifold 108 and may receive the melt from a sprue bushing or other structure that interfaces with the injection machine. Each hot-tip nozzle 112 is located at a nozzle region 150 of hot-runner manifold 108. In the present example, hot-runner manifold 108 is a unitary monolithic body that can be readily fabricated using a suitable fabrication technique, such as a freeform fabrication technique (see below). That said, hot-runner manifold 108 may be made using conventional manifold fabrication techniques, such as straight drilling and plugging, as long as the configurations of the various channels within the manifold are not too complex/intricate.

In many conventional injection-molding apparatuses, melt in the melt channels is kept hot using electrical-resistance-type heating elements, such as heating element 152 of FIG. 1, which is often installed into a recess, here recess 156, formed in the backside of hot-runner manifold 108. A problem that can be experienced with using conventional electrical-resistance-type heating elements of this type is that relatively high heat must be applied by the heating elements because the melt channels are relatively far from the melt channels, and this high heat can cause localized overheating if the heating elements are poorly routed.

To avoid such problems in the embodiment of injection-molding apparatus 100 shown in FIG. 1, hot-runner manifold 108 optionally includes non-melt heating channels 160 provided to carry a suitable heating fluid, such as a high-temperature alkylated aromatic compound, oil, etc., from a heating-fluid source 164 into the manifold in close proximity to melt channels 148. A benefit of running heating channels 160 close to melt channels 148 is that the temperature of the heating fluid can be kept low relative to the temperature needed in conventional electrical-resistance-type heating elements, such as heating element 152. In this example, heating channels 160 are arranged to form a continuous circuit between a fluid inlet 168, which receives the heating fluid from the heating-fluid source 164, and a fluid outlet 172, from which the heating fluid is returned to the heating source for reheating and recirculation. In the embodiment shown, heating channels 160 are shown as being straight, such that they can be formed using any suitable manufacturing technique, including drilling and plugging, casting, and additive manufacturing. In other embodiments, the heating channels can be configured and arranged in virtually any suitable/desired configuration and arrangement to suit a particular design. Other examples of heating channels of the present disclosure are illustrated in connection with other figures of this disclosure. It is noted that alternatively to having a single heat-channel circuit for an entire hot-runner manifold, a single manifold can have a plurality of separate circuits that can be served by either a plurality of fluid inlets and outlets (like inlet 168 and outlet 172) or inlet and outlet manifolds (not shown) or a combination of both.

For the sake of completeness, the embodiment of injection-molding apparatus 100 of FIG. 1 includes a mold plate 176 that defines a manifold cavity 180 in which hot-runner manifold 108 is located. A backing plate 184 is provided to close mold cavity 180, as well as to hold hot-runner manifold 108 and hot-tip nozzle 112 in place via an arrangement that includes a Bellville washer 188 and insulative spacer 192, among other components.

Figure 2:
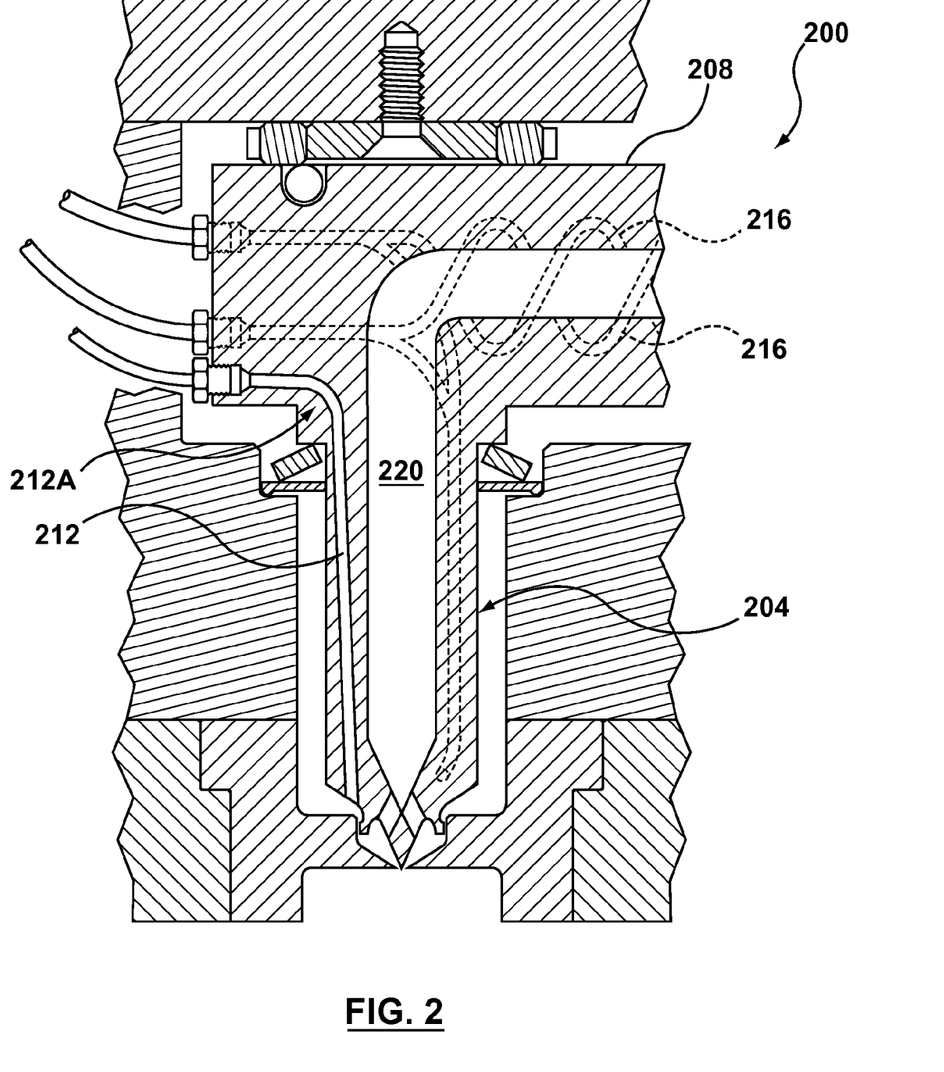
FIG. 2 is a cross-sectional partial view of an injection-molding apparatus similar to the injection-molding apparatus of FIG. 1, wherein the nozzles are monolithically formed with the hot-runner manifold.

FIG. 2 illustrates an embodiment of an injection-molding apparatus 200 that is similar to injection-molding apparatus 100 of FIG. 1, except for a few differences, including the fact that in apparatus 200 of FIG. 2, each hot-tip nozzle 204 (one shown) is formed monolithically with the hot-runner manifold 208, such as by using an additive manufacturing process, for example, a freeform-fabrication process, some of which are described below in connection with FIG. 5. Another difference is the path of each non-melt nozzle-tip-coolant channel 212, which unlike the path of coolant channel 124 of FIG. 1, cannot be formed using conventional straight drilling and plugging techniques. Rather, the relatively large-radiused bend 212A of coolant channel 212 needs to be formed using another process, such as an additive-manufacturing process, for example, a freeform-fabrication process. A further difference is the arrangement (i.e., path) of the non-melt heating-fluid channels 216. Instead of being straight runs in the manner of heating-fluid channels 160 of FIG. 1, heating-fluid channels 216 of FIG. 2 are arranged to run in an up-and-down (relative to FIG. 2) zig-zag path generally on both "sides" (front and back relative to FIG. 2) of the melt channel 220. Such an arrangement of heating-fluid channels 216 is suited for manufacturing using freeform-fabrication techniques.

In this connection, still another difference is that instead of heating-fluid channels 216 being present only in hot-runner manifold 208 in the manner of heating-fluid channels 160 of FIG. 1, in injection-molding apparatus 200 of FIG. 2, heating-fluid channels 216 extend into hot-tip nozzles 204. As those skilled in the art will readily appreciate, this eliminates the need for conventional external heating elements (not shown) that are typically electrical-resistance-type heating elements present around each nozzle. It is noted that while the fact that hot-tip nozzles 204 are monolithically formed with hot-runner manifold 208 can make it relatively easy to run heating fluid channels into the nozzles free of any part-to-part interruptions, such as nozzle-to-manifold interface 144 of FIG. 1, in other embodiments having nozzles manufactured separately from the manifold, the heating-fluid channels can likewise be run into the nozzles from the manifold in a manner similar to heating-fluid channels 216 of FIG. 2. However, care must be taken to ensure that the nozzle-to-manifold interfaces, such as interface 144 of FIG. 1, is fluid tight in the regions wherein the heating-fluid channels cross those interfaces. Suitable fluid-tight seals can be made, for example, using gaskets and/or sealing rings, or a precisely machined pre-loaded interface (such as the one shown in FIG. 1), among other things. Other components and aspects of injection-molding apparatus 200 of FIG. 2 can be the same as or similar to the like components and aspects of injection-molding apparatus 100 of FIG. 1.

Figure 3:
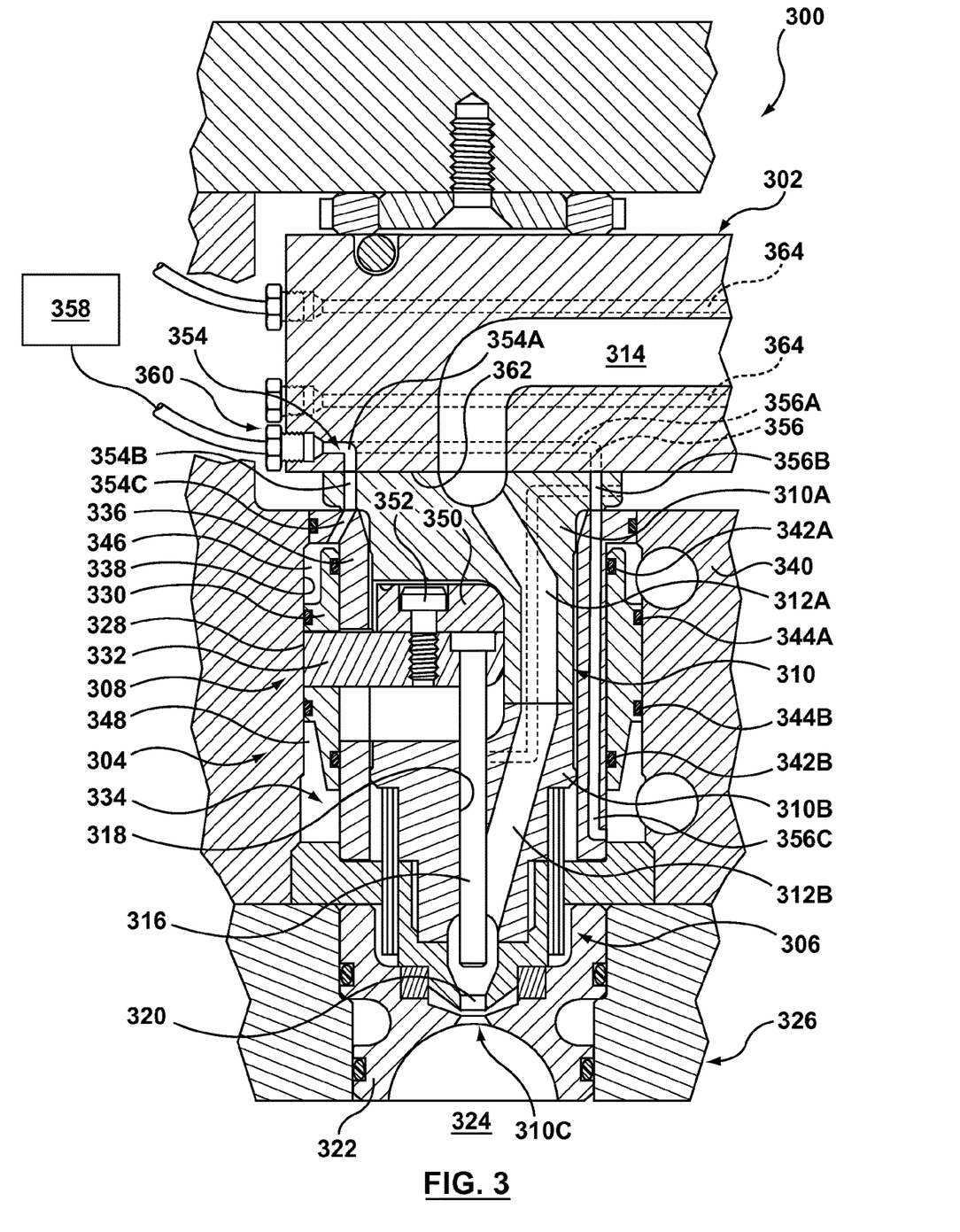
FIG. 3 is a cross-sectional partial view of an injection-molding apparatus that includes a hot-runner manifold containing non-melt channels for providing an actuating fluid to nozzle-side valve actuators.

FIG. 3 illustrates another use of non-melt channels within a hot-runner manifold, nozzle, and/or other components. Referring now to FIG. 3, this figures shows an injection molding apparatus 300 that includes a hot-runner manifold 302 and a nozzle/valve assembly 304 that comprises a valve-gated nozzle 306 and a valve 308. Valve-gated nozzle 306 includes a main body 310 composed of two parts 310A and 310B, with part 310B including a nozzle tip 310C. Nozzle parts 310A and 310B contain, respectively, melt-channel segments 312A and 312B of a melt channel 312 that carry a melt (not shown) from a melt channel 314 within hot-runner manifold 302 to nozzle tip 310C. Valve 308 includes a valve pin 316 slidably engaged within a receiving passageway 318 within nozzle part 312B. Valve pin 316 is designed and configured to be movable to a closed position (not shown) wherein it sealingly engages a nozzle-tip outlet 320 to controllably stop the flow of the melt from melt-channel segment 312B. As described in more detail below, valve pin 316 is shown in an open position, wherein the melt in melt-channel segment 312B can flow through nozzle-tip outlet 320, through a gate insert 322, and into a mold cavity 324 within the mold 326.

Valve 308 also includes a piston 328 having a collar 330 and a valve-pin support 332. Piston collar 330 is designed and configured to reciprocate within a cavity 334 defined by a nozzle sleeve 336 on the inside and a wall 338 of the mold plate 340 on the inside. A first pair of piston rings 342A and 342B provide a sliding seal between piston collar 330 and nozzle sleeve 336, and a second pair of piston rings 344A and 344B provide a sliding seal between the piston collar and wall 338 of mold plate 340. As can be readily appreciated, piston rings 342A and 344A cooperate with their respective interfacing parts to form a first actuation chamber 346, and piston rings 342B and 344B cooperate with their respective interfacing parts to form a second actuation chamber 348. Valve-pin support 332 fixedly holds valve pin 316 via a retainer 350 and a fastener 352. During operation, first and second actuation chambers 346 and 348 are alternatingly pressurized (or evacuated or one is pressurized and the other is evacuated) to cause piston collar 330 and, therefore, valve pin 316 to move up and down (relative to FIG. 3). In this manner, valve pin 316 is alternatingly moved between open and closed positions using one or more actuation fluids (not shown), such as air, hydraulic fluid, etc., in conjunction with first and second actuation chambers 346 and 348.

To provide the actuation fluid to, and/or remove actuation fluid from, first and second actuation chambers 346 and 348, injection-molding apparatus 300 includes, respectively, first and second non-melt actuation-fluid channels 354 and 356. First and second non-melt actuation-fluid channels 354 and 356 are fluidly coupled to one or more actuation-fluid controllers 358 that perform the necessary actuation-fluid pressurization and/or evacuation needed to actuate valve 308. In the embodiment shown, first non-melt actuation-fluid channel 354 extends through hot-runner manifold 308, nozzle part 310A, and nozzle sleeve 336 via channel segments 354A, 354B, and 354C, respectively, and second non-melt actuation-fluid channel 356 extends through the hot runner manifold, nozzle part 310A, and the nozzle sleeve via channel segments 356A, 356B, and 356C, respectively. Each of actuation-fluid channels 354 and 356 can be provided with any suitable coupling ports (only one port 360 shown), respectively, for coupling to the one or more actuation-fluid controllers 354. Sealing of the various channel segments 354A-354C and 356A-356C can be effected using any suitable means, such as using gaskets and/or sealing/rings or a precisely machined pre-loaded interface (such as the interface 362 shown in FIG. 3), among other things.

In addition to non-melt actuation-fluid channels 354 and 356, in the embodiment shown injection-molding apparatus 300 includes a heating-fluid channel 364, which, as described above in connection with FIGS. 1 and 2, is provided for the purpose of keeping the melt within hot-runner manifold 308, here the melt within melt channel segment 312C within the manifold. As described above, heating-fluid channel 364 can have any suitable arrangement and configuration, and the configuration and arrangement shown in FIG. 3 is merely exemplary and should in no way be considered limiting. Fundamentally, heating-fluid channel 364 or plurality of channels can have any configuration and arrangement that performs the function of keeping the melt within hot-runner manifold 308 at the proper temperature. Aspects of heating-fluid channel 364 and associated components, such as a heating fluid source (not shown), can be the same as or similar to the like aspects and components described above in connection with FIGS. 1 and 2. Similarly, other components and aspects of injection-molding apparatus 300 of FIG. 3 can be the same as or similar to the like components and aspects of injection-molding apparatus 100 of FIG. 1.

Figure 4:
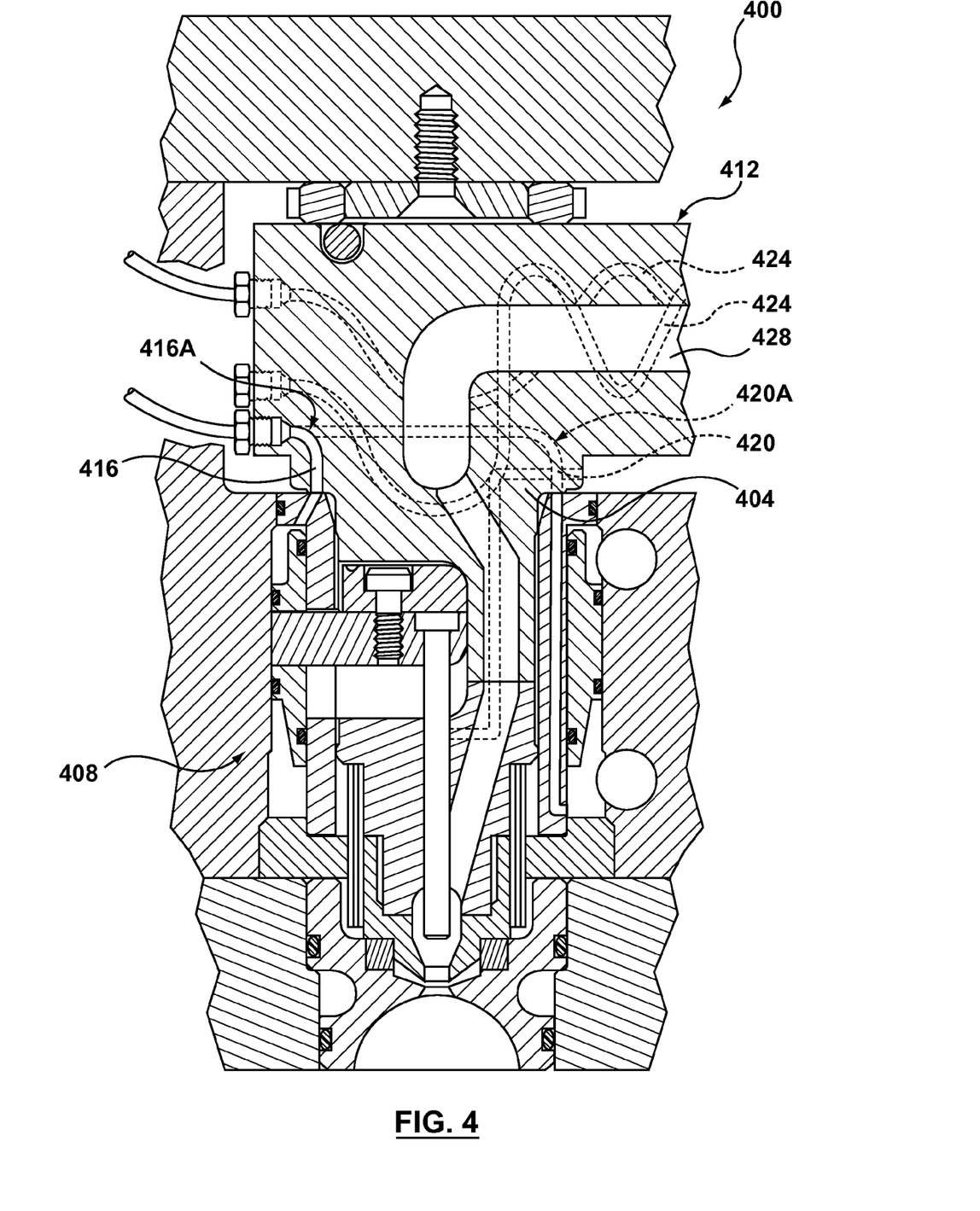
FIG. 4 is a cross-sectional partial view of an injection-molding apparatus similar to the injection-molding apparatus of FIG. 3, wherein the nozzles are monolithically formed with the hot-runner manifold.

FIG. 4 illustrates an embodiment of an injection-molding apparatus 400 that is similar to injection-molding apparatus 300 of FIG. 3, except for a few differences, including the fact that in apparatus 400 of FIG. 4, main body 404 of each valve-gated nozzle 408 (one shown) is formed monolithically with the hot-runner manifold 412, such as by using an additive manufacturing process, for example, a freeform-fabrication process. Another difference is the paths of the non-melt actuation-fluid channels 416 and 420, which unlike the paths of actuation-fluid channels 354 and 356 of FIG. 3, cannot be formed using conventional straight-line drilling and plugging techniques. Rather, the relatively large-radiused bends 416A and 420A of actuation-fluid channels 416 and 420, respectively, need to be formed using another process, such as an additive-manufacturing process, for example, a freeform-fabrication process. A further difference is the arrangement (i.e., path) of the non-melt heating-fluid channels 424. Instead of being straight runs in the manner of heating-fluid channels 364 of FIG. 3, heating-fluid channels 424 of FIG. 4 are arranged to run in an up-and-down (relative to FIG. 4) zig-zag path generally on both "sides" (front and back relative to FIG. 4) of the melt channel 428. Such an arrangement of heating-fluid channel 424 is suited for manufacturing using freeform-fabrication techniques.

In this connection, still another difference is that instead of heating-fluid channels 424 being present only in hot-runner manifold 412 in the manner of heating-fluid channels 364 of FIG. 3, in injection-molding apparatus 400 of FIG. 4, heating-fluid channels 424 extend into valve-gated nozzles 408. As those skilled in the art will readily appreciate, this eliminates the need for conventional external heating elements (not shown) that are typically electrical-resistance-type heating elements present around each nozzle. It is noted that while the fact that valve-gated nozzles 408 is monolithically formed with hot-runner manifold 412 can make it relatively easy to run heating fluid channels into the nozzles free of any part-to-part interruptions, such as nozzle-to-manifold interface 362 of FIG. 3, in other embodiments having nozzles manufactured separately from the manifold, the heating-fluid channels can likewise be run into the nozzles from the manifold in a manner similar to heating-fluid channels 424 of FIG. 4. However, care must be taken to ensure that each nozzle-to-manifold interface, such as interface 362 of FIG. 3, is fluid tight in the regions wherein the heating-fluid channels cross the interface. Suitable fluid-tight seals can be made, for example, using gaskets and/or sealing/rings), or a precisely machined pre-loaded interface (such as the one shown in FIG. 3), among other things. Other components and aspects of injection-molding apparatus 400 of FIG. 4 can be the same as or similar to the like components and aspects of injection-molding apparatus 100 of FIG. 1.

Figure 5:
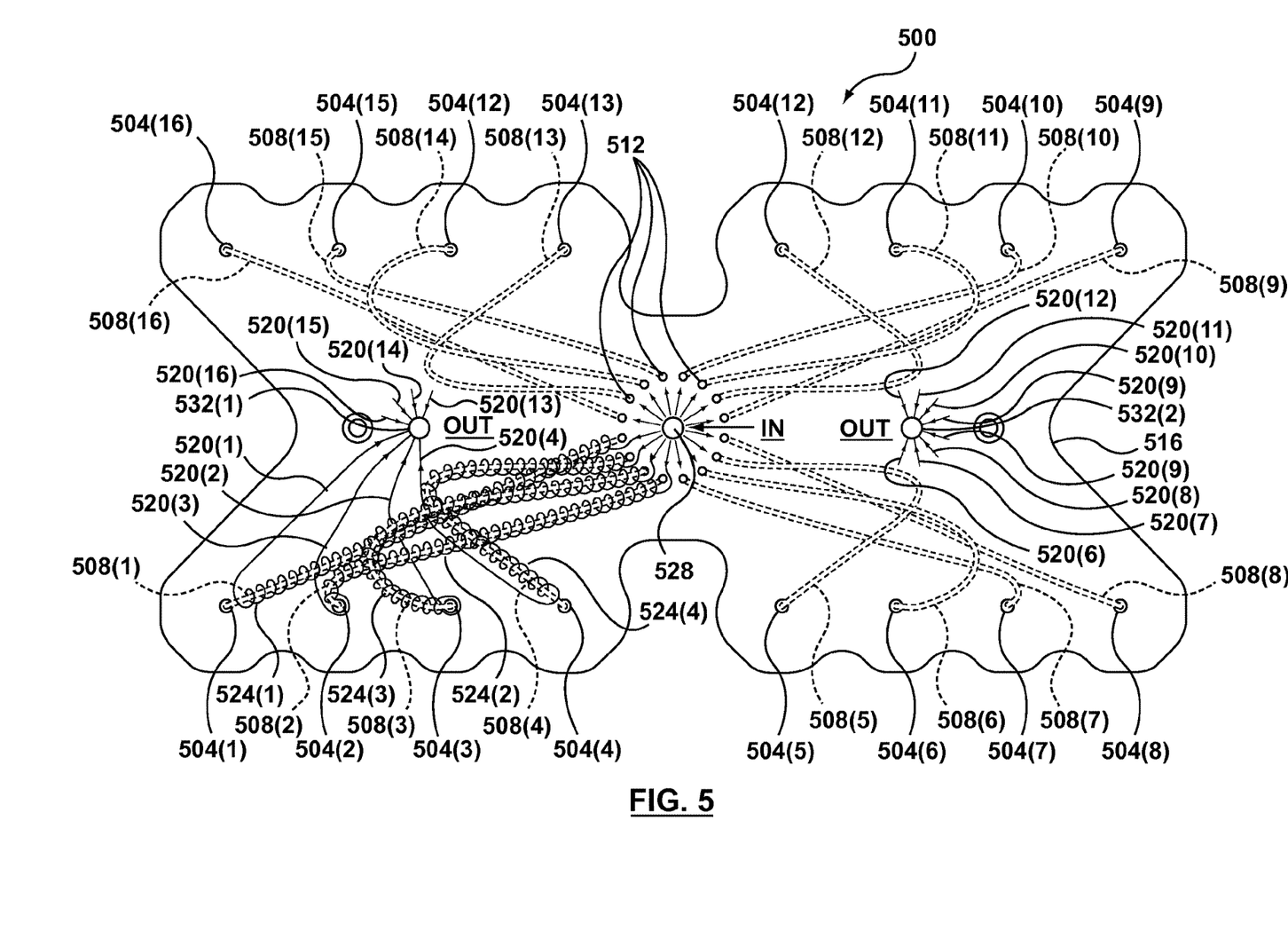
FIG. 5 is top view of a hot-runner manifold that includes integrated non-melt channels that circulate a heating fluid for maintaining melt in the melt channels at a desired temperature.

FIG. 5 illustrates a relatively complexly shaped hot-runner manifold 500 that is formed using a freeform fabrication process, which allows for such complexity, complexity that is not possible with conventional hot-runner manifold fabricating processes. Hot-runner manifold 500 includes sixteen nozzles 504(1) to 504(16), each fed with melt (not shown) by a corresponding melt-channel 508(1) to 508(16). As will be readily appreciated by those skilled in the art, melt-channels 508(1) to 508(16) are particularly configured to equalize the pressure drops from inlets 512 (only a few of which are labeled to avoid clutter) to nozzles 504(1) to 504(16) among all of the melt channels so that, during injection of the melt into a mold (not shown) the pressures at the outlets of the nozzles are all the same or substantially the same as one another. This allows for very predictable and uniform flow of melt from the injection machine (not shown) to the mold. This pressure-drop equalization is effected in the embodiment shown by adjusting the lengths and/or pathways of the ones of melt channels 508(1) to 508(16) that feed nozzles 504(2) to 504(7) and 504(10) to 504(15), i.e., the ones of nozzles 504(1) to 504(16) that are closer than nozzles 504(1), 504(8), 504(9), and 504(16) that are farthest from their corresponding respective inlets 512 so that they have the same pressure drop as the naturally longest melt channels 508(1), 508(8), 508(9), and 508(16) that feed those farthest nozzles 504(1), 504(8), 504(9), and 504(16). Equalizing the pressure drops across all sixteen melt channels in this manner is why melt channels 508(2) to 508(7) and 508(10) to 508(15) are longer and less direct in routing than they would need to be if they were largely straight like melt-channels 508(1), 508(9), 508(10), and 508(16). It should be well appreciated by those skilled in the art that the complex curvatures of melt channels 508(2) to 508(7) and 508(10) to 508(15), which are formed in an otherwise unitary monolithic body 516, are only practicable using freeform fabrication techniques. Such complex, yet gently curved, pathways of melt channels 508(2) to 508(7) and 508(10) to 508(15) simply cannot be made using conventional hot-runner manifold fabrication techniques, such as straight drilling, plugging, and machining.

Hot-runner manifold 500 further includes a set of complexly shaped non-melt channels that are in the form of heating channels 520(1) to 520(16) that, like melt channels 508(1) to 508(16) are formed in unitary monolithic body 516 by virtue of the selected freeform fabrication process. As noted above, an effective and efficient way to implement heating channels is to locate them as close to the melt channels as practicable so as to place the heat as close to the melt channels as possible. In the example of FIG. 5 and as shown particularly by heating channels 520(1) to 520(4), heating channels 520(1) to 520(16) are configured as helixes (only four helixes 524(1) to 524(4) shown to avoid clutter), each "corkscrewing" around a corresponding one of the melt channels. In this example, all of heating channels 520(1) to 520(16) share a common inlet 528, while heating channels 520(1) to 520(4) and 520(13) to 520(16) share a common outlet 532(1) and heating channels 520(5) to 520(12) share a common outlet 532(2).

As those skilled in the art will readily appreciate, in alternative embodiments of a melt-channel heating system for the melt-channel configuration of hot-runner manifold 500, the configuration(s) of the heating channel(s) may be different from the configurations of heating channels 520(1) to 520(16) and the number of inlets and outlets for the heating channels may be any number needed to suit the particular heating-channel configuration(s) used. That said, it is noted that the fewer the inlets and outlets, the less complex the connecting of such inlet(s) and outlet(s) to one or more heating fluid sources. As those skilled in the art will also readily appreciate, the highly complex and intricate (relative to conventional hot-runner design) arrangement of heating channels 520(1) to 520(16) is virtually impossible to execute using conventional hot-runner subtractive manufacturing techniques, such as straight drilling and plugging, for forming channels within a hot-runner manifold body. Rather, such complex and intricate arrangements are enabled using additive manufacturing techniques, such as freeform fabrication techniques.

Examples of freeform fabrication techniques that could be used for fabricating a hot-runner manifold of the present disclosure include, but are not limited to: (A) electron beam melting (fully fused void-free solid metal parts from powder stock); (B) electron beam freeform fabrication (fully fused void-free solid metal parts from wire feedstock); (C) laser-engineered net shaping (a laser is used to melt metal powder and deposit it on the part directly; this has the advantage that the part is fully solid and the metal alloy composition can be dynamically changed over the volume of the part); (D) POLYJET MATRIX (the first technology that enables simultaneous jetting of multiple types of materials); (E) selective laser sintering (selective laser sintering uses a laser to fuse powdered metal, nylon, or elastomer; additional processing is necessary to produce fully dense metal part); (F) shape deposition manufacturing (part and support materials are deposited by a printhead and then machined to near-final shape Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An injection-molding system, comprising:
a hot-runner manifold comprising a body that includes:
   a melt-inlet;
   an injection-nozzle region;
   a melt channel extending from said melt inlet to said injection-nozzle region;
   a coolant inlet for receiving air;
   a coolant outlet designed and configured to cool a nozzle tip at a front end of a hot-tip injection nozzle by directing the air toward the nozzle tip when the hot-tip injection nozzle is located at said injection-nozzle region, the melt channel extending into a back end of the hot-tip injection nozzle and through the nozzle tip when the hot-tip injection nozzle is located at the injection-nozzle region, the coolant outlet being nearer to the nozzle tip than the back end of the hot-tip injection nozzle; and
   a coolant channel extending from said coolant inlet to said coolant outlet and being fluidly isolated from said melt channel, wherein the coolant channel extends at least partially alongside the melt channel and wherein the coolant channel is designed and configured to convey the coolant from said coolant inlet to said coolant outlet to cool the nozzle tip.

2. An injection-molding system according to claim 1, further comprising the injection nozzle, wherein said injection nozzle comprises a coolant-channel segment fluidly coupled to said coolant channel of said hot-runner manifold.

3. An injection-molding system according to claim 2, wherein said coolant outlet is located proximate to said nozzle tip.

4. An injection-molding system according to claim 2, wherein said injection nozzle is formed separately from said hot-runner manifold.

5. An injection-molding system according to claim 1, further comprising the injection nozzle, wherein said injection nozzle is formed unitarily monolithically with said body.

6. An injection-molding system according to claim 5, wherein said injection nozzle and said body are formed using a freeform fabrication process.

7. An injection-molding system comprising:
a hot-runner manifold comprising a body that includes:
   a melt-inlet
   an injection-nozzle region
   a melt channel extending from said melt inlet to said injection-nozzle region;
   a first actuator-fluid inlet for receiving the first actuator fluid;
   a first actuator-fluid outlet in fluid communication with said valve actuator; and
   a first actuator-fluid channel extending from said first actuator-fluid inlet to said first actuator-fluid outlet and being fluidly isolated from said melt channel
a valve-gated-nozzle assembly secured to said body at said injection-nozzle region, said valve-gated-nozzle assembly including a stem valve;
a valve actuator designed and configured to move said stem valve in response to movement of a first actuator fluid;
wherein:
   said first actuator-fluid channel designed and configured to convey the first actuator fluid from said first actuator-fluid inlet toward said valve actuator.

8. An injection-molding system according to claim 7, wherein said valve-gated-nozzle assembly includes a valve body formed unitarily monolithically with said body of said hot-runner manifold.

9. An injection-molding system according to claim 8, wherein said valve-gated-nozzle assembly includes a valve body formed unitarily monolithically with said body of said hot-runner manifold using a free-form-fabrication process.

10. An injection-molding system according to claim 7, wherein said valve actuator is designed and configured to move said step valve in response to movement of the first actuator fluid and a second actuator fluid and said body further comprises:
   a second actuator-fluid inlet for receiving the second actuator fluid;
   a second actuator-fluid outlet in fluid communication with said valve actuator; and
   a second actuator-fluid channel designed and configured to convey the second actuator fluid from said second actuator-fluid inlet toward said valve actuator.

* * * * *